United States Patent

Bridgewater et al.

[11] Patent Number: 5,475,754
[45] Date of Patent: Dec. 12, 1995

[54] PACKET VIDEO SIGNAL INVERSE TRANSPORT PROCESSOR MEMORY ADDRESS CIRCUITRY

[75] Inventors: Kevin E. Bridgewater, Indianapolis; Michael S. Deiss, Zionsville, both of Ind.

[73] Assignee: Thomson Consumer Electronics, Inc., Indianapolis, Ind.

[21] Appl. No.: 232,787

[22] Filed: Apr. 22, 1994

[51] Int. Cl.$^6$ ............................................. H04N 7/167
[52] U.S. Cl. ..................... 380/20; 370/110.1; 348/384; 348/441; 348/409
[58] Field of Search ................. 380/20, 10; 358/133, 358/141, 135; 370/110.1

[56] References Cited

U.S. PATENT DOCUMENTS

| | | | |
|---|---|---|---|
| 5,168,356 | 12/1992 | Acampora et al. | 358/133 |
| 5,233,654 | 8/1993 | Harvey et al. | 380/20 |
| 5,239,365 | 8/1993 | Uz | 348/469 |
| 5,289,276 | 2/1994 | Siracusa et al. | 348/467 |
| 5,371,547 | 12/1994 | Siracusa et al. | 348/426 |

*Primary Examiner*—David C. Cain
*Attorney, Agent, or Firm*—Joseph S. Tripoli; Eric P. Herrmann; Ronald H. Kurdyla

[57] ABSTRACT

In an inverse transport processor, program component packet payloads of respective program components are directed to select areas of random access memory (RAM) (18) in accordance with a plurality of start and end pointers which are stored in a first plurality (86, 89) of registers, one for each program component. Addresses are generated, in part, by a plurality of read pointer registers (82) multiplexed with an adder (80) to successively increment the pointers for respective program components. The start pointers are associated with read pointers to from memory addresses that scroll through designated memory blocks selectively assigned to respective program components. Memory access for read and write functions are arbitrated (98) so that no incoming program data can be lost, and all component processors are serviced.

20 Claims, 5 Drawing Sheets

PACKET VIDEO SIGNAL INVERSE TRANSPORT PROCESSOR MEMORY ADDRESS CIRCUITRY

This invention relates to apparatus for separating program packets from a packet video signal and extracting corresponding payloads of different program signal components, with emphasis on apparatus for addressing a transport buffer memory.

BACKGROUND OF THE INVENTION

It is known from, for example, U.S. Pat. No. 5,168,356 and U.S. Pat. No. 5,289,276, that it is advantageous to transmit compressed video signal in packets, with respective packets affording a measure of error protection/correction. The systems in the foregoing patents transmit and process a single television program, albeit with a plurality of program components, from respective transmission channels. These systems utilize inverse transport processors to extract the video signal component of respective programs for further processing to condition the video component for reproduction. The U.S. Pat. No. 5,289,276 patent only discusses processing the video signal component. The U.S. Pat. No. 5,168,356 patent describes an inverse transport processor which separates other program components with a simple demultiplexer responsive to packet header data for distinguishing respective signal components. The separated video component is coupled to a buffer memory, while the remaining signal components are shown coupled directly to their respective processing circuitry.

In applications where most of the program components are compressed, some buffering is needed between the transmission channel and most of the respective component processing (decompression) apparatus, thus it is desirable to couple most, if not all components to buffer memory. In addition, if the inverse transport processor resides in, for example, a set top box, the memory size and management circuitry should be kept to a minimum to keep consumer costs as low as possible. In addition it is economically desirable to utilize the same memory and memory management circuitry for processor house keeping and interactive functions.

SUMMARY OF THE INVENTION

The present invention is a memory arrangement for and inverse transport processor. Program component packet payloads of respective program components are multiplexed to a memory data input port and directed to select areas of random access memory (RAM) in accordance with a plurality of start and end pointers. The start and end pointers are stored in a first plurality of registers, one for each program component. Addresses are generated, in part, by a plurality of read pointer registers multiplexed with an adder to successively increment the pointers for respective program components. The start pointers are associated with read pointers to from memory addresses that scroll through designated memory blocks selectively assigned to respective program components. Memory access for read and write functions are arbitrated so that no incoming program data can be lost, and all component processors are serviced.

BRIEF DESCRIPTION OF THE DRAWINGS

The invention will be described with reference to the drawings, wherein.

DETAILED DESCRIPTION

Figure 1:
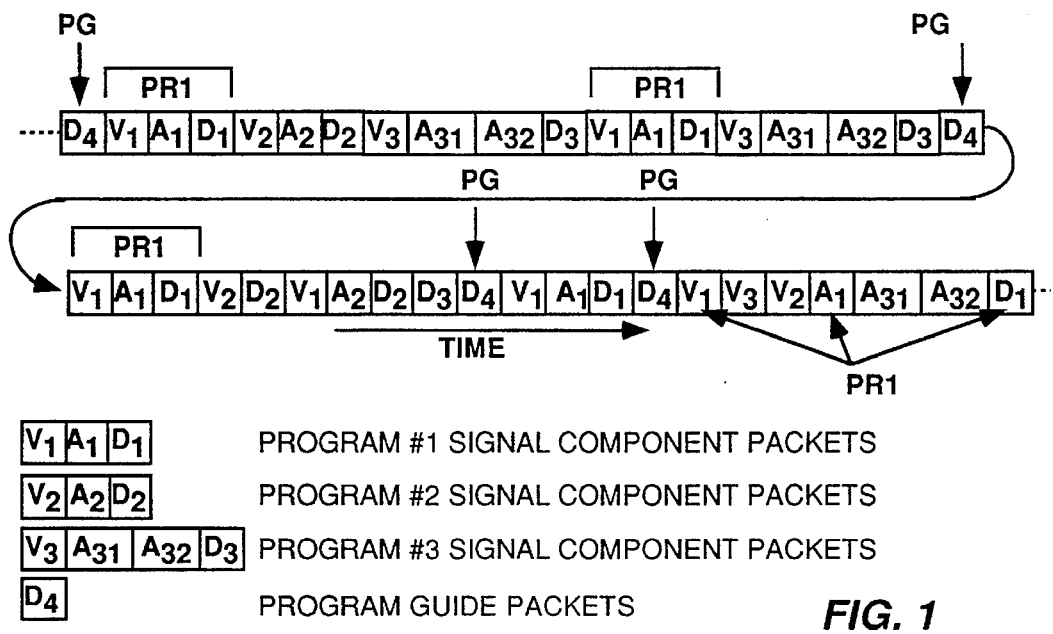
FIG. 1 is a pictorial representation of a time division multiplexed packet television signal.

FIG. 1 shows a signal stream consisting of a string of boxes which represent signal packets which are components of a plurality of different television or interactive television programs. These program components are assumed to be formed of compressed data and as such the quantity of video data for respective images is variable. The packets are of fixed length. Packets with letters having like subscripts represent components of a single program. For example, $V_i$, $A_i$, $D_i$ represent video, audio and data packets and packets designated $V_1$, $A_1$, $D_1$, represent video, audio and data components for program 1, and $V_3$, $A_{31}$, $A_{32}$, $D_3$, represent video, audio 1, audio 2 and data components of program 3. In the upper line of the string of packets the respective components of a particular program are shown grouped together. However there is no necessity of packets from the same program being grouped as is indicated by the entire string of packets. Nor is there any particular order for the sequence of occurrence of respective components.

Figure 2:
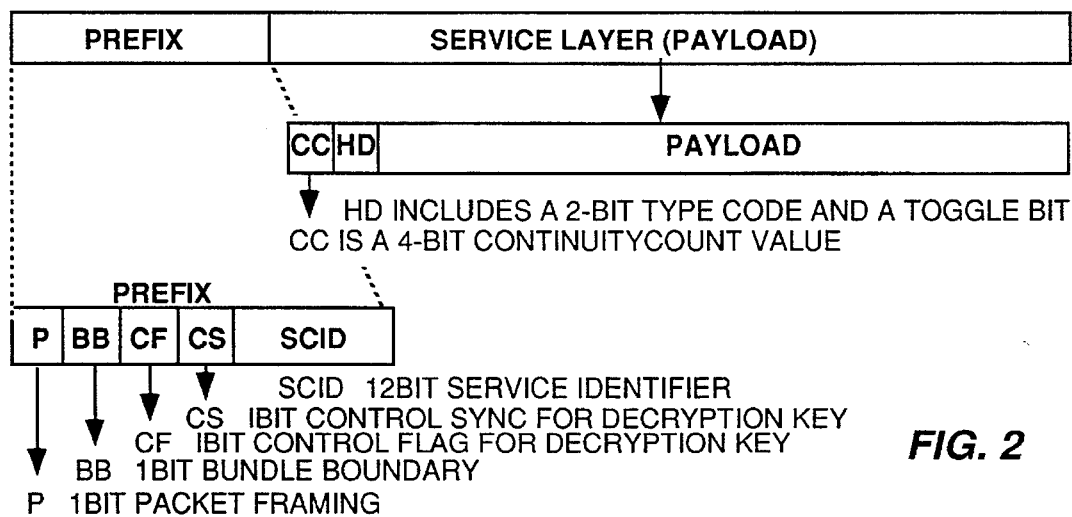
FIG. 2 is a pictorial representation of respective signal packets.

The respective packets are arranged to include a prefix and a payload as shown in FIG. 2. The prefix of this example includes two 8-bit bytes comprising five fields, four (P, BB, CF, CS) of which are 1-bit fields, and one (SCID) of which is a 12-bit field. The SCID field is the signal component identifier. The field CF contains a flag to indicate whether the payload of the packet is scrambled, and the field CS contains a flag which indicates which of two alternative unscrambling keys is to be utilized to unscramble scrambled packets. The prefix of every packet is packet aligned, thus the location of the respective fields are easily identifiable.

Within video payloads is a header which contains a continuity count, CC, modulo 16, and a TOGGLE flag bit. The continuity count is simply a successive numbering of successive packets of the same program component. The TOGGLE flag bit is a one bit signal which changes logic level or toggles in the packet which starts each new picture (frame).

Figure 3:
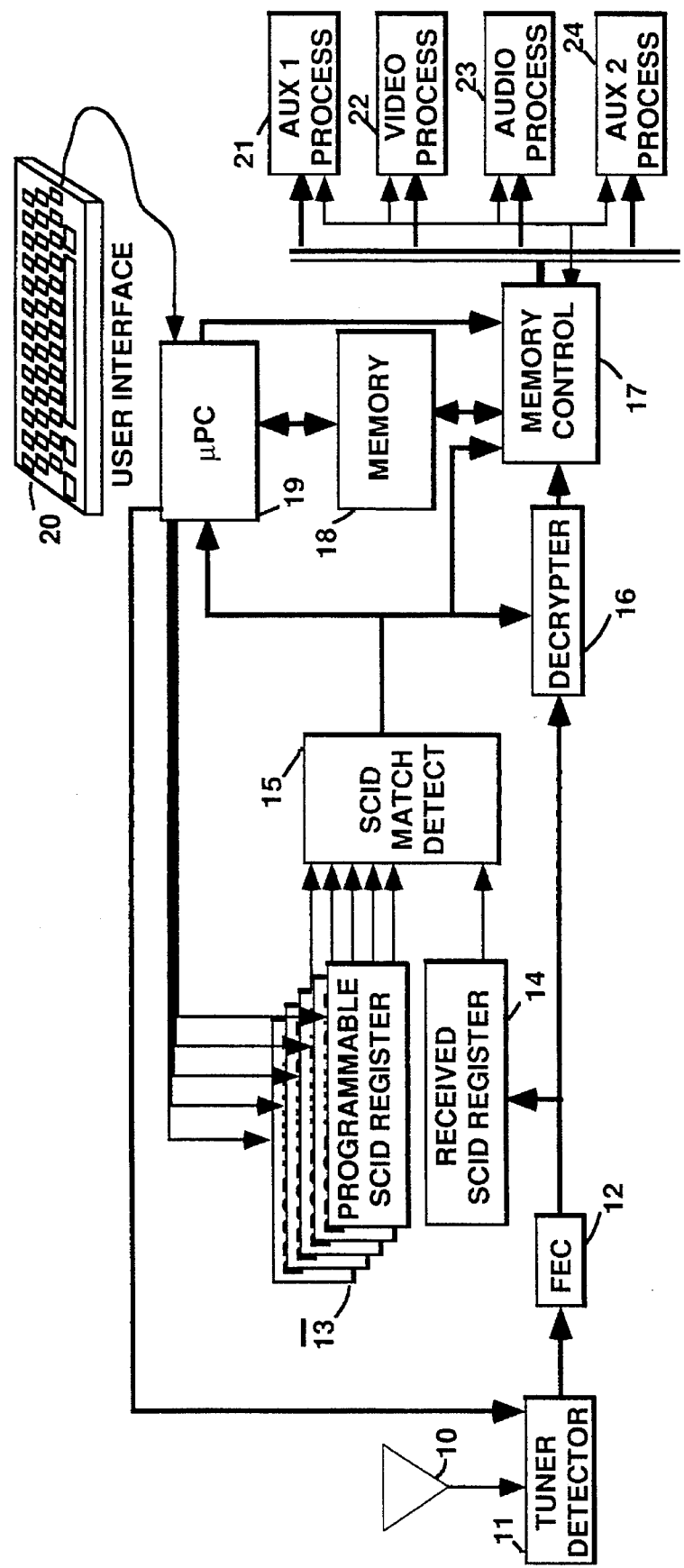
FIG. 3 is a block diagram of a receiver for selecting and processing packets of multiplexed component signals embodying the present invention.

FIG. 3 illustrates in block form, a portion of digital television signal receiver including elements of an inverse transport processor. Signal is detected by an antenna 10 and applied to a tuner detector, 11, which extracts s a particular frequency band of received signals, and provides baseband compressed signal in a binary format. The frequency band is selected by the user through a microprocessor 19 by conventional methods. Nominally broadcast digital signals will have been error encoded using, for example, Reed-Solomon forward error correcting (FEC) coding. The baseband signals will thus be applied to a FEC decoder, 12. The FEC decoder 12 synchronizes the received video and provides a stream of signal packets of the type illustrated in FIG. 1. The FEC 12 may provide packets at regular intervals, or on demand, by for example, memory controller 17. In either case a packet framing or synchronizing signal is provided by the FEC circuit, which indicates the times that respective packet information is transferred from the FEC 12.

The detected frequency band may contain a plurality of time division multiplexed programs in packet form. To be useful, only packets from a single program should be passed to the further circuit elements. In this example it is assumed that the user has no knowledge of which packets to select. This information is contained in a program guide, which in itself is a program consisting solely of data which interrelates program signal components through SCID's. The program guide is a listing for each program, of the SCID's for the audio, video, and data components of respective programs. The program guide (packets D4 in FIG. 1) is assigned a fixed SCID. When power is applied to the receiver, the microprocessor 19 is programmed to load the SCID associated with the program guide into one of a bank of similar programmable SCID registers 13. The SCID fields of the prefix portion of respective detected packets of signal from the FEC 12 are successively loaded in a further SCID register 14. The programmable registers and the received SCID register are coupled to respective input ports of a comparator circuit 15, and the received SCID is compared with the program guide SCID. If the SCID for a packet matches the program guide SCID, the comparator 15 conditions a memory controller 17 to route that packet to a predetermined location in the memory 18 for use by the microprocessor. If the received SCID does not match the program guide SCID, the corresponding packet is simply dumped.

The microprocessor waits for a programming command from the user via an interface 20, which is shown as a computer keyboard, but which may be a conventional remote control, or receiver front panel switches. The user may request to view a program provided on channel 4 (in the vernacular of analog TV systems). The microprocessor 19 is programmed to scan the program guide list that was loaded in the memory 18 for the respective SCID's of the channel 4 program components, and to load these SCID's in respective other ones of the programmable registers of the bank of registers 13 which are associated with corresponding component signal processing paths.

Received packets of audio, video or data program components, for a desired program, must ultimately be routed to the respective audio 23, video 22, or auxiliary data 21, (24) signal processors respectively. The data is received at a relatively constant rate, but the signal processors nominally require input data in bursts (according to the respective types of decompression for example). The exemplary system of FIG. 3, first routes the respective packets to predetermined memory locations in the memory 18. Thereafter the respective processors 21–24 request the component packets from the memory 18. Routing the components through the memory provides a measure of desired signal data rate buffering or throttling.

The audio, video and data packets are loaded into respective predetermined memory locations to enable the signal processors easy access to the component data. In order that the payloads of respective component packets get loaded in the appropriate memory areas, the respective SCID com-parators are associated with those memory areas. This association may be hardwired in the memory controller 17, or the association may be programmable. If the former, specific ones of the programmable registers 13 will always be assigned the audio, video and data SCID's respectively. If the latter the audio, video and data SCID's may be loaded in any of the programmable registers 13, and the appropriate association will be programmed in the memory controller 17 when the respective SCID's are loaded in the programmable registers.

In the steady state, after the program SCID's have been stored in the programmable registers 13, the SCID's of received signal packets are compared with all of the SCID's in the programmable SCID registers. If a match is made with either a stored audio, video or data SCID, the corresponding packet payload will be stored in the audio, video or data memory area or block respectively.

The respective signal packets are coupled from the FEC 12 to the memory controller 17 via a signal decryptor 16. Only the signal payloads are scrambled and the packet headers are passed by the decryptor unaltered. Whether or not a packed is to be descrambled is determined by the CF flag in the packet prefix, and how it is to be descrambled is determined by the CS flag. If no SCID match is had for a respective packet, the decryptor may simply be disabled from passing any data. Alternatively, if there is no SCID match for a packet the decryptor may be allowed to decrypt according to its last settings and the memory write control may be disabled to dump the respective packet.

Figure 4:
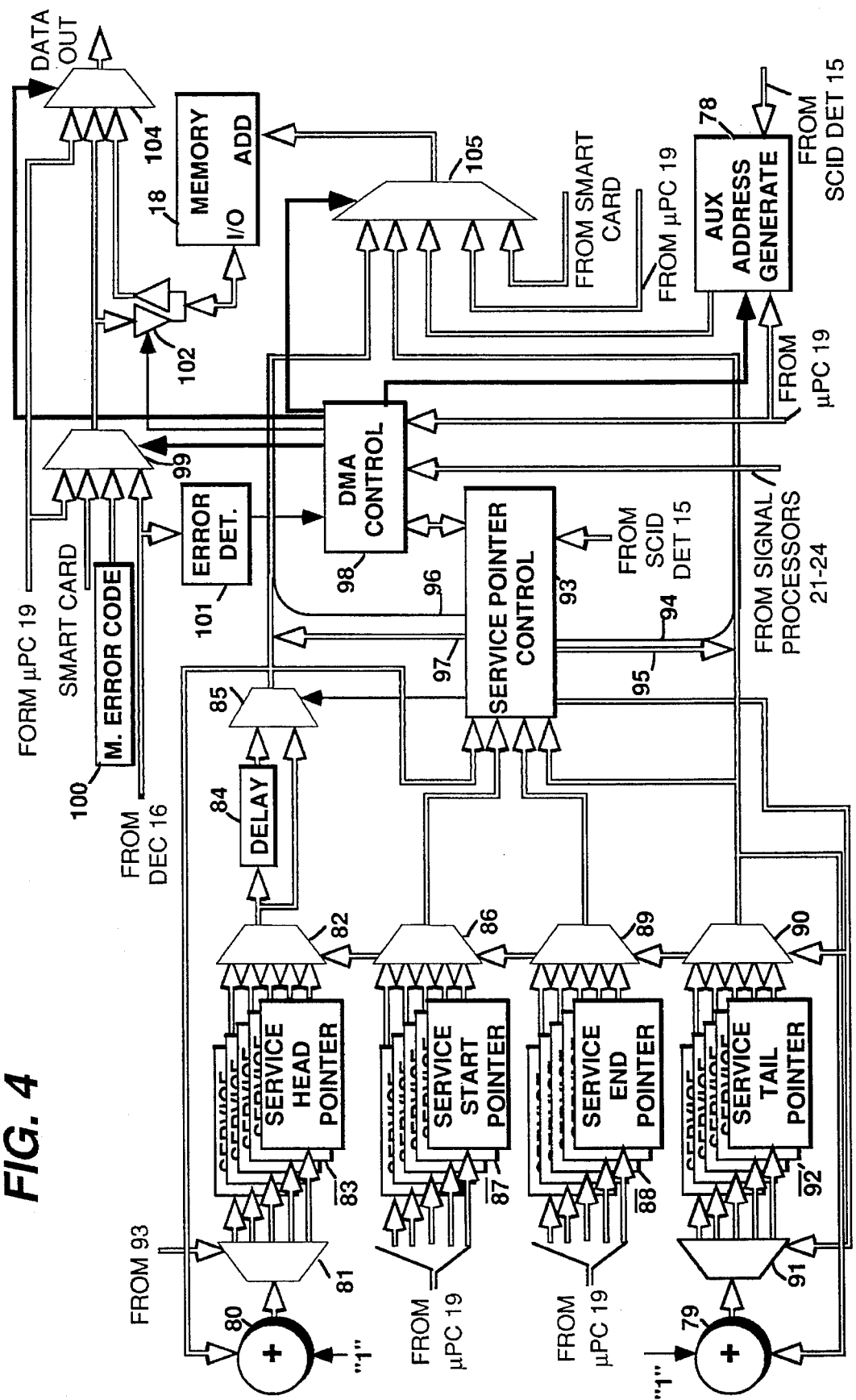
FIG. 4 is a block diagram of exemplary memory management circuitry which may be implemented for element 17 of FIG. 3.

FIG. 4 illustrates exemplary apparatus for the memory controller 17 shown in FIG. 3. Each program component is stored in a different contiguous block of the memory 18. In addition other data, such as data generated by the microprocessor 19 or a Smart Card (not shown) may be stored in the memory 18.

Addresses are applied to the memory 18 by a multiplexor 105, and input data is applied to the memory 18 by a multiplexor 99. Output data from the memory management circuitry is provided to the signal processors by a further multiplexor 104. Output data provided by the multiplexor 104 is derived from the microprocessor 19, the memory 18 or directly from the multiplexor 99. Program data is presumed to be of standard picture resolution and quality, and occurring at a particular data rate. On the other hand high definition television signals, HDTV, which may be provided by this receiver, occur at a significantly higher data rate. Practically all data provided by the FEC will be routed through the memory 18 via the multiplexor 99 and memory I/O circuit 102, except for the higher rate HDTV signals which may be routed directly from the multiplexer 99 to the multiplexor 104. Data is provided to the multiplexer 99 from the decryptor 16, the smart card circuitry, the microprocessor 19, and a source of a media error codes 100. The term "media error codes as used herein, means special codewords to be inserted in a data stream, to condition the respective signal processor (decompressor) to suspend processing until detection of a predetermined codeword such as a start code, and then to resume processing in accordance with the e.g. start code.

Memory addresses are provided to the multiplexor 105, from program addressing circuitry 79–97, from the microprocessor 19, from the Smart Card apparatus (not shown) and from the auxiliary packet address counter 78. Selection of the particular address at any particular time period is controlled by a direct memory access DMA, circuit 98. The SCID control signals from the comparator 15 and "data needed" signals from respective signal processors are applied to the DMA 98, and responsive thereto, memory access contention is arbitrated. The DMA 98 cooperates with a Service Pointer Controller 93, to provide the appropriate read or write addresses for respective program signal components.

The respective addresses for the various signal component memory blocks are generated by four groups of program component or service pointer registers 83, 87, 88, and 92. The starting pointers for respective blocks of memory, into which respective signal components are stored, are contained in registers 87 for the respective signal components. The start pointers may be fixed values, or they may be calculated by conventional memory management methods in the microprocessor 19.

The last address pointers for respective blocks are stored in the bank of service registers 88, one for each potential program component. Similar to the start addresses, the end addresses may be fixed values or they may be calculated values provided by the microprocessor 19. Using calculated values for starting and end pointers is preferred because it provides a more versatile system with less memory.

The memory write pointers or head pointers are generated by the adder 80 and the service head registers 83. There is a service head register for each potential program component. A write or head pointer value is stored in a register 83, and provided to the address multiplexor 105 during a memory write cycle. The head pointer is also coupled to the adder 80, wherein it is incremented by one unit, and the incremented pointer is stored in the appropriate register 83 for the next write cycle. The registers 83 are selected by the service pointer controller, 93, for the appropriate program component currently being serviced.

In this example it is assumed that the start and end pointers are 16-bit pointers. The registers 83 provides 16 bit write or head pointers. 16-bit pointers were selected to facilitate use of 16-bit or 8-bit busses for loading the start and end pointers in the registers 87 and 88. The memory 18, on the other hand, has 18-bit addresses. The 18-bit write addresses are formed by concatenating the two most significant bits of the start pointers to the 16-bit head pointers, with the start pointer bits in the most significant bit positions of the combined 18-bit write address. The start pointers are provided by the respective registers 87 to the service pointer controller 93. The service pointer controller parses the more significant start pointer bits from the start pointers stored in registers 87, and associates these bits with the 16-bit head pointer bus. This is illustrated by the bus 96 shown being combined with the head pointer bus exiting the multiplexor 85, and by FIG. 5 with reference to the bold arrows.

Figure 5:
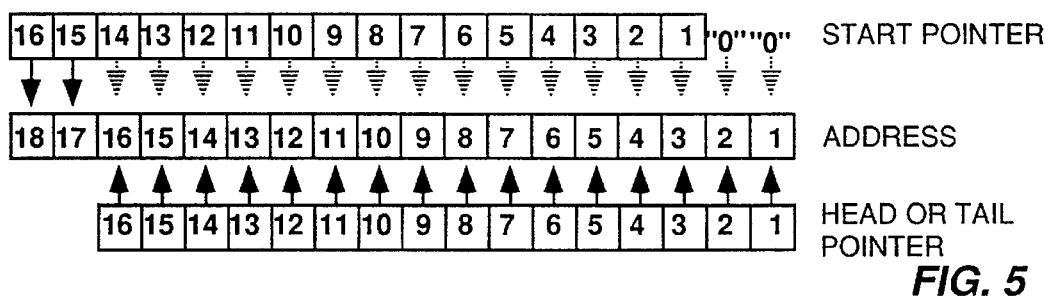
FIG. 5 is a pictorial representation showing memory address formation for service channel data.

In FIG. 5, the top middle and bottom rows of boxes represent the bits of a start pointer, an address and a head or tail pointer respectively. The higher numbered boxes represent more significant bit positions. The arrows indicate from which bit positions of the start or head/tail pointers the respective bits of an address are derived. In this derivation the bold arrows represent steady state operation.

Similarly, memory read pointers or tail pointers are generated by the adder 79 and the service tail registers 92. There is a service tail register for each potential program component. A read or tail pointer value is stored in a register 92, and provided to the address multiplexor 105 during a memory read cycle. The tail pointer is also coupled to the adder 79, wherein it is incremented by one unit, and the incremented pointer is stored in the appropriate register 92 for the next read cycle. The registers 92 are selected by the service pointer controller, 93, for the appropriate program component currently being serviced.

The registers 92 provides 16 bit tail pointers. 18-bit read addresses are formed by concatenating the two most significant bits of the start pointers to the 16-bit tail pointers, with the start pointer bits in the most significant bit positions of the combined 18-bit write address. The service pointer controller parses the more significant start pointer bits from the start pointers stored in registers 87, and associates these bits with the 16-bit tail pointer bus. This is illustrated by the bus 94 shown being combined with the tail pointer bus exiting the multiplexor 90.

Data is stored in the memory 18 at the calculated address. After storing a byte of data, the head pointer is incremented by one and compared to the end pointer for this program component, and if they are equal the more significant bits of the head pointer are replaced with the lower 14 bits of the start pointer and zeros are placed in the lower two bit positions of the head pointer portion of the address. This is illustrated in FIG. 5 with reference to the hatched arrows between the start pointers and the address. This operation is illustrated by the arrow 97 pointing from the service pointer controller 93 to the head pointer bus from the multiplexor 85. It is presumed that application of the lower 14 start pointer bits override the head pointer bits. Replacing the head pointer bits with the lower start pointer bits in the address for this one write cycle, causes the memory to scroll through the memory block designated by the upper two start pointer bits, thus obviating reprogramming write addresses at the start of each packet to a unique memory location within a block.

If the head pointer ever equals the tail pointer (used to indicate where to read data from the memory 18) a signal is sent to the interrupt section of the microprocessor to indicate that a head tail crash has occurred. Further writing to the memory 18 from this program channel is disabled until the microprocessor re-enables the channel. This case is very rare and should not occur in normal operation.

Data is retrieved from the memory 18 at the request of the respective signal processors, at addresses calculated by the adder 79 and registers 92. After reading a byte of stored data, the tail pointer is incremented by one unit and compared to the end pointer for this logical channel in the service pointer controller 93. If the tail and end pointers are equal then the more significant bits of the tail pointer are replaced with the lower 14 bits of the start pointer and zeros are placed in the lower two bit positions of the tail pointer portion of the address. This is illustrated by the arrow 95 emanating from controller 93 and pointing to the tail pointer bus from the multiplexor 90. If the tail pointer is now equal to the head pointer, then the respective memory block is defined as empty and no more bytes will be sent to the associated signal processor until more data is received from the FEC for this program channel. The actual replacement of the head or tail pointer portions of the respective write or read addresses by the lower 14 bits of the start pointer may be accomplished by appropriate multiplexing, or the use of three state interconnects.

Figure 6:
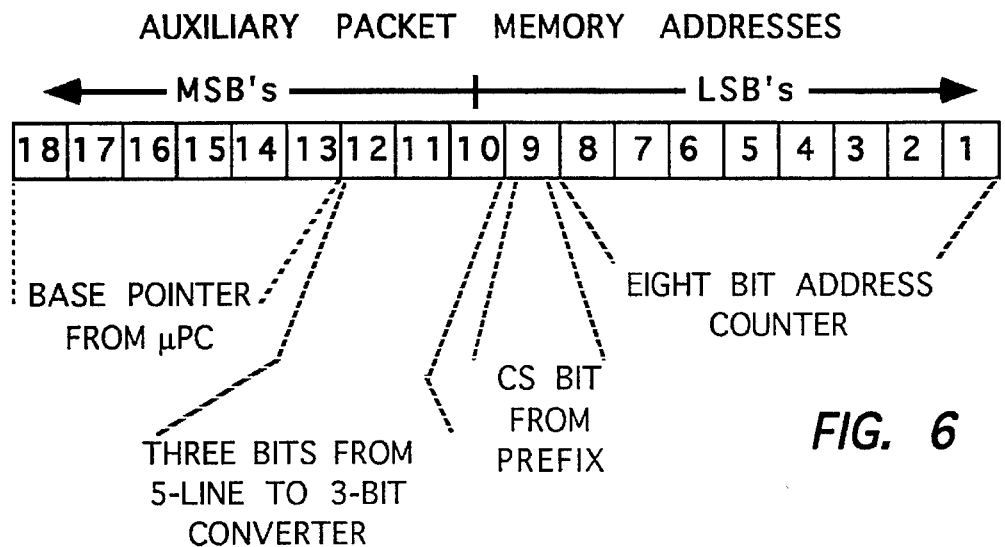
FIG. 6 is a pictorial representation showing memory address formation for auxiliary packet data.

Data transmitted in auxiliary packets is typically directory, header or control information and thus is processed slightly differently from program component data. Data in the auxiliary packets include information necessary to establish the requisite memory storage areas for the respective program components and any included applications. As such auxiliary packets are given preference. Two service blocks are provided for each component. Each block has an eight bit sequential address or storage locations for 256 bytes of data. Each block has an eighteen bit total address which is illustrated in FIG. 6. The eight LSB's of the address are provided by a sequential counter. The ninth bit is provided by the CS or scramble key bit from the transport prefix. The tenth through twelfth bits are generated responsive to the particular SCID's assigned for program detection. This example assumes that the system has provision for processing and detecting five program components (including program guide) or services. There are thus five SCID's programmed in the respective programmable SCID registers 13 and five SCID comparators, 15. The five comparators each have an output terminal, which terminal is assigned a program component. The five possible programs that are associated with the five comparator output terminals are assigned respective three bit codes, three bits being the fewest number of bits that can represent five states. The three bit codes are the tenth through twelfth bits of the auxiliary packet addresses. Assume that SCID's for five respective program components are assigned to programmable registers arbitrarily numbered 1–5. The three bit codes assigned to the components assigned to the programmable registers 1–5 are 000, 001, 010, 011, and 100 respectively. Depending upon which program component is currently being detected, the three bit code associated with the programmable register containing the current program component SCID, will be inserted into the tenth through twelfth bit positions in the memory write address.

The six most significant bits of the 18 bit auxiliary addresses are provided by the microprocessor according to conventional memory management techniques.

Figure 7:
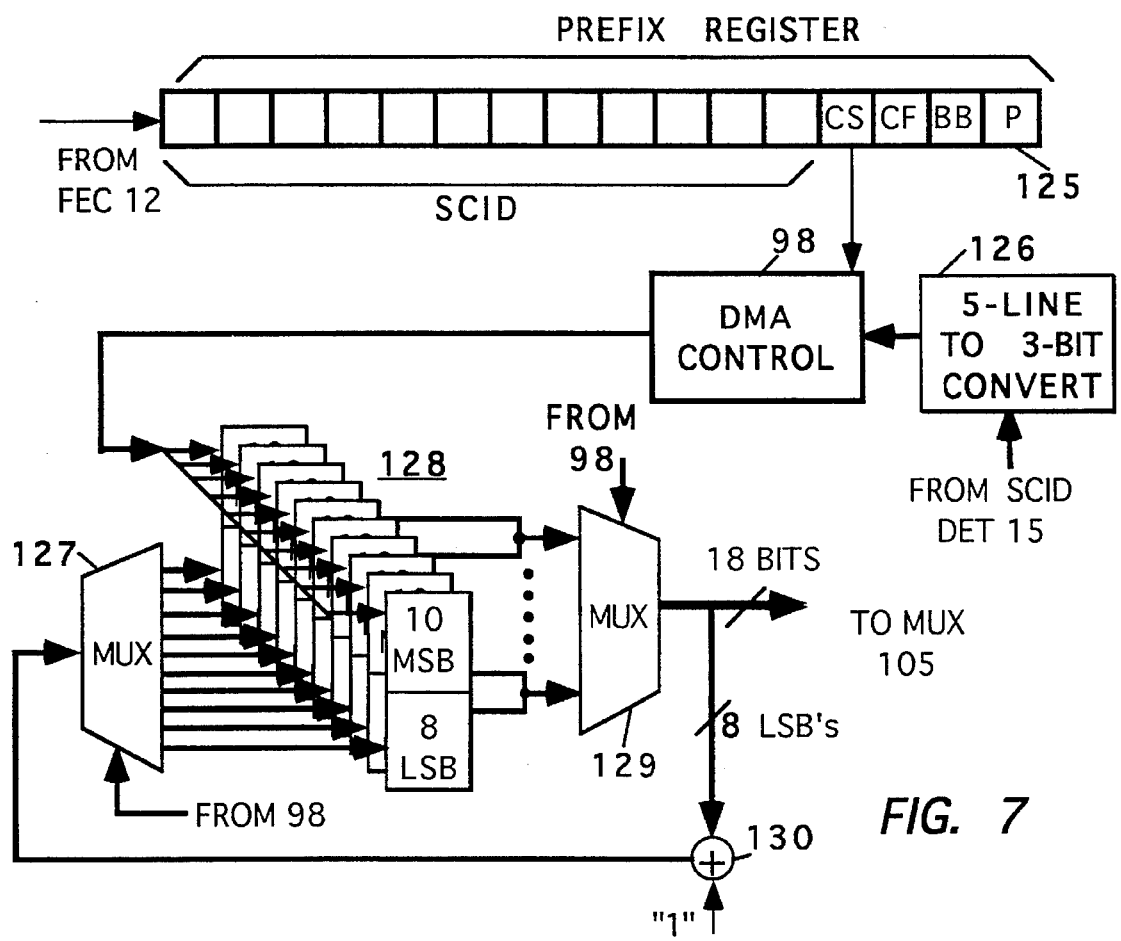
FIG. 7 is a block diagram of exemplary circuitry for generating auxiliary packet memory addresses.

FIG. 7 illustrates exemplary auxiliary memory address generating circuitry. FIG. 7 includes a prefix register 125 used for capturing the prefix bit CS, which is applied to the DMA controller 98. The five control lines from the SCID detector 15 are applied to a five control line to three bit converter 126, which may be a simple Boolean logic operator. The three bits generated by the converter 126 are applied to the DMA controller 98 which composes respective 10 most significant bit (MSB) portions of auxiliary addresses. On detection of an auxiliary packet, the 10-MSB address portion is applied to the MSB portion of one of a bank of registers 128. The 8-LSB portion of the respective register 128 is set to a predetermined value, typically zero, at the beginning of each auxiliary packet. The 8-LSB portion is appended to the 10-MSB portion and applied to an input port of a 10-to-1 multiplexer 129. The 8-LSB portion of respective addresses provided by the multiplexer 129 are coupled to an adder 130, wherein the 8-LSB address value is incremented by one unit and coupled back into the 8-LSB portion of the register 128 via a further multiplexer 127. The incremented LSB portion (with its MSB portion) serves as the next successive address for the respective auxiliary packet. The multiplexers 127 and 129 are controlled by the DMA controller 98 for selecting the current memory block to be addresses. Note, in an alternative arrangement the μPC 19 may be arranged to establish at least a portion of the auxiliary addresses.

Auxiliary packets may be processed independently and an entire auxiliary packet payload will typically be loaded in memory before it can be utilized. As such, the block of memory being addressed for writing a current auxiliary packet thereto, will not normally be addressed concurrently for read and write purposes. Therefor the same registers may be used for read and write addressing. Once an auxiliary packet is stored in a respective block of memory, the 8-LSB portion is reset to the predetermined starting address in preparation for data readout. In an alternative arrangement, a parallel bank of registers, multiplexers and an adder similar to elements 127–130 may be configured for generating read addresses. These read addresses may be time division multiplexed with a further multiplexer in cascaded connection with the multiplexer 129.

Memory read/write control is performed by the service pointer controller and direct memory access, DMA, elements 93 and 94. The DMA is programmed to schedule read and write cycles. Scheduling is dependent upon whether the FEC 12 is providing data to be written to memory or not. FEC data write operations take precedence so that no incoming signal component data is lost. In the exemplary apparatus illustrated in FIG. 4, there are four types of apparatus which may access the memory. These are Smart Card (not shown), the FEC 12 (more precisely the decryptor 16), the microprocessor 19 and one of the application devices such as the audio and video processors. Memory contention is handled in the following manner. The DMA, responsive to data requests from the various processing elements listed above, allocates memory access as follows. Access to the memory is provided in 95 nS time slots during which a byte of data is read from or written to the memory 18. There are two major modes of access allocation, defined by "FEC Providing Data", or "FEC Not Providing Data" respectively. For each of these modes the time slots are allocated and prioritized as follows, assuming a maximum FEC data rate of 5 Mbytes/second, or one byte for each 200 nS. These are:

FEC Providing Data
1) FEC data write;
2) Application device read/Microprocessor read/write;
3) FEC data write;
4) Microprocessor read/write;
and for
FEC Not Providing Data
1) Smart Card read/write;
2) Application device read/Microprocessor read/write;
3) Smart Card read/write;
4) Microprocessor read/write.

Because FEC data writes cannot be deferred, the FEC (or more correctly the decryptor), when providing data must be guaranteed memory access during each 200 nS interval. Alternate time slots are shared by the application devices and the microprocessor. When there is no data available for the requesting devices, the microprocessor is provided use of the application time slots.

The Controller 93 communicates with the SCID detector to determine which of the respective Start, head and end pointer registers to access for memory write operations. The controller 93 communicates with the DMA to determine which of the start, end and tail registers to access for memory read operations. The DMA 98 controls selection of the corresponding addresses and data by the multiplexers 99, 104 and 105.

Figure 8:
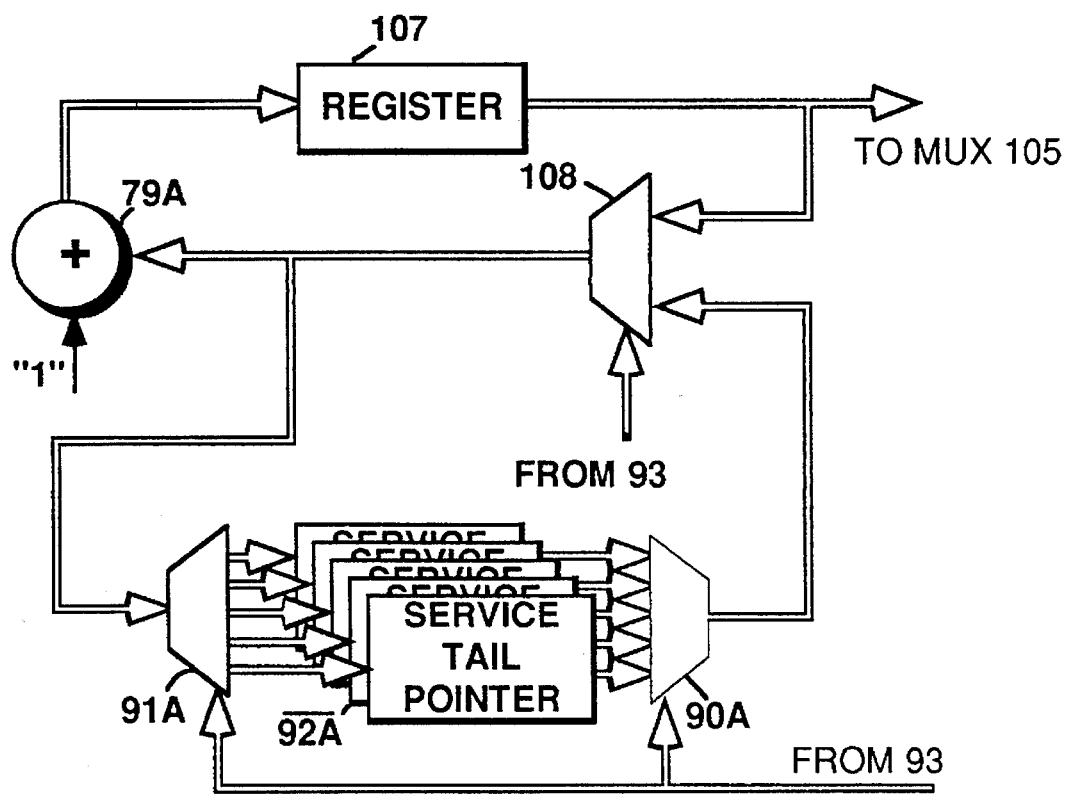
FIG. 8 is a block diagram of alternative register circuitry for incrementing memory addresses.

Preferred alternative circuitry for incrementing memory addresses is shown in FIG. 8, which circuitry may be utilized in either the FIG. 4 or FIG. 7 apparatus. FIG. 8 illustrates its implementation as for tail pointer incrementing according to FIG. 4. At the beginning of a packet, the pointer in the associated register 92A is coupled to the adder 79A, wherein it is incremented by 1. Rather than storing intermediate incremented tail pointers in the registers 92A of FIG. 8 (92 of FIG. 4), intermediate incremented pointer values are successively stored in a working register 107. After the last pointer value is generated for a packet of signal, the updated pointer in register 107 is transferred to the register 92A associated with the packet SCID.

It is not uncommon that data in a memory buffer may need to be omitted. For example a partial packet may have been stored when a system error or a data interrupt occurred. To conserve memory space, the data omission is performed simply by overwriting the partial packet of data. Overwriting this data is effected by resetting the appropriate pointer to the value it exhibited at the beginning of the packet. Such resetting is accomplished by not transferring the value in register 107 to the pointer register, that is by doing nothing.

It is advantageous to insert media error codes into the video component signal stream when packets are lost, to condition the video signal decompressor to suspend decompression until a particular signal entry point occurs in the data stream. It is not practical to predict where and in which video packet the next entry point may occur. In order to find the next entry point as fast as possible, it is necessary to include a media error code at the beginning of the first video packet after detection that a packet is lost. The circuitry of FIG. 4 places a media error code at the beginning of every video packet and then excises the media error code in respective packets if there is no loss of a preceding packet. The media error code is inserted in the first M memory address locations reserved for the current video packet payload, by writing to memory 18 for M write cycles prior to the video payload arriving from the decrypter. Concurrently the multiplexor 99 is conditioned by the DMA 98, to apply the media error code from the source 100 to the memory 18 I/O. M is simply the integer number of memory locations required to store the media error code. Assuming the memory to store 8-bit bytes, and the media error code to be 32 bits, M will equal 4.

The addresses for loading the media error code in memory are provided by the respective video component service register 83 via the multiplexer 82 and multiplexer 85. It will be appreciated that the first M addresses provided from the pointer register 83 for loading the media error code into the memory locations that would otherwise be loaded with video component data, will simply be the next M sequential addresses that would normally be produced by the video head pointer. These same addresses are coupled into an M-stage delay element 84, so that immediately after the last byte of the media error code is stored in the memory 18, the first of the M addresses is available at the output of the delay element 84.

The timing of the loading of the media error code into memory coincides with the determination of a lost packet. Loading the media error code while packet loss determination is performed places no additional timing constraints on signal flow processing.

If a packet loss is detected, the video component of the current packet is stored in memory 18, starting at the next or (M+1)$^{th}$ address location of the memory block established for that component. This is accomplished by conditioning the multiplexer 85 to continue to pass undelayed head pointers from the appropriate register 83. Alternatively, if a packet loss is not detected, the first M bytes of the video component in the current packet are stored in the memory locations in which the media error code was immediately previously stored. This is accomplished by the service pointer controller conditioning the multiplexer 85 to pass the delayed head pointers from the delay element 84, for M write cycles. At the end of the M write cycles the service pointer controller 93 will condition the multiplexer to again pass undelayed head pointers. When the multiplexer switches back to non delayed pointers, the next non delayed pointer will correspond to the M+1$^{th}$ address.

Packet error or loss detection is performed by an error detector 101 which is responsive to the CC and HD data of the current packet. The detector 101 examines the continuity count CC in the current packet to determine if it differs from the CC of the previous packet by one unit. In addition the TOGGLE bit in the current packet is examined to determine if it has undergone a change from the previous packet. If the CC value is incorrect, the state of the TOGGLE bit is examined. Depending if one or both of the CC and TOGGLE bit are in error or changed respectively, first or second modes of error remediation are instituted. In the second mode, initiated by the CC being in error and the TOGGLE bit having changed, the system is conditioned to reset to a packet containing a picture layer header. In the first mode, where only the CC is erroneous, the system is conditioned to reset to a packet containing a slice start code. (A slice layer is a subset of compressed data within a frame.) In both the first and second modes, the media error code written to memory is retained in the respective payload to alert the decompressor to institute remedial action.

Depending upon the particular designs of a given receiver, it may or may not be conducive to include media error codes in different ones of the signal components when respective component transport packets are lost. In addition it may be advantageous to utilize different media error codes for different signal component formats or compression processes. Thus one or more media error code sources may be required.

What is claimed is:

1. Apparatus in an audio/video signal transport processor for processing signal including time division multiplexed packets of program components, wherein respective packets include a payload of component data and a header including a component identifier, SCID, and wherein respective payloads are extracted from respective packets and stored in buffer memory, circuitry for addressing said buffer memory comprising;

a source (12) of time division multiplexed packets;

a detector (15), responsive to respective headers for detecting packets having predetermined identifiers;

a control apparatus (19) programmed to generate a plurality of N-bit start and end pointers to allocate a plurality of blocks of said buffer memory for storage of packets of a plurality of program components (N an integer);

first and second like pluralities of registers (87, 88) for storing said plurality of N-bit start pointers and N-bit end pointers respectively;

third and fourth like pluralities of registers (83, 92) for storing N-bit head (write) pointers and N-bit tail (read) pointers respectively, wherein a set of registers, one from each of said first, second, third and fourth pluralities are assigned to each respective program component;

wherein for respective sets of registers:
      circuitry (93, 96) for concatenating M bits of said start pointer with said N-bit head pointer to form an N+M-bit write address (M an integer less than N);
      circuitry (93, 94) for concatenating M bits of said tart pointer with said N-bit tail pointer to form an N+M-bit read address;
      multiplexing (82, 86, 89, 90) means for multiplexing one of said read or write addresses to an address input port of said buffer memory.

2. The apparatus set fourth in claim 1 further including:
   an incrementer for incrementing the one of the head and tail pointers in the third or fourth registers corresponding to the head or tail pointer from which the last multiplexed address was formed.

3. The apparatus set fourth in claim 1 further including:

a comparator for detecting when a respective head pointer equals a corresponding end pointer; and means responsive to the detection of the head and end pointer being equal, for generating the next write address with said N-bit start pointer in the most significant bit positions of said M+N-bit write address and zeroes in the M least significant bit positions.

4. The apparatus set fourth in claim 1 further including:

a comparator for detecting when a respective head pointer equals a corresponding tail pointer; and means responsive to the detection of the head and tail pointer being equal, for generating a system interrupt.

5. The apparatus set fourth in claim 1 wherein the multiplexing means is responsive to the detection of respective SCID's for selecting the respective set of pointer registers to generate a respective write address.

6. The apparatus set fourth in claim 5 further including:

a comparator for detecting when a respective head pointer equals a corresponding end pointer; and means responsive to the detection of the head and end pointer being equal, for generating the next write address with said N-bit start pointer in the most significant bit positions of said M+N-bit write address and zeroes in the M least significant bit positions, and wherein the N-bit head pointer is concurrently replaced by the N-M least significant bits of the start address in its most significant bit positions and zeroes in its M least significant bit positions.

7. The apparatus set fourth in claim 1 wherein said packets are of two types, basic and auxiliary, and respective packet headers include a scramble key CS, and circuitry for generating buffer memory addresses for auxiliary packet payloads comprises:

a detector for detecting said scramble key CS in respective auxiliary packets;

a translator for generating W-bit codes related to the type of program component with which respective auxiliary packets are associated;

a plurality of M+N-bit address registers, respective ones of which are associated with different program components, K bits of respective registers are loaded with address pointers generated by said control apparatus, and L bits of respective registers are reserved for variable values, K and L are integers and K+L equals M+N;

wherein said control apparatus is arranged to generate a Z-bit pointer which is concatenated with said W-bit code and said scramble key CS, and the Z-bit pointer, the W-bit code and the scramble key sum to K-bits; and means for incrementing the L-bit variable value by one unit subsequent its usage in forming an auxiliary packet address.

8. The apparatus set fourth in claim 7 further including means for resetting the L-bit variable value to a predetermined value at the beginning of respective auxiliary packets.

9. The apparatus set fourth in claim 7 further including multiplexing means for selecting a respective one of said plurality of address registers for application of an address to the address input port of said buffer memory.

10. The apparatus set fourth in claim 7 wherein respective registers are utilized for generating both buffer memory read and write addresses.

11. The apparatus set fourth in claim 7 wherein said plurality of address registers includes two registers for each program component.

12. The apparatus set fourth in claim 7 wherein L is 8, W is 3, CS is 1 bit, and Z is 6.

13. The apparatus set fourth in claim 1 wherein said packets are of two types, basic and auxiliary, and respective packet headers include a scramble key CS, and circuitry for generating buffer memory addresses for auxiliary packet payloads comprises:

a detector for detecting said scramble key CS in respective auxiliary packets;

a translator for generating W-bit codes related to the type of program component with which respective auxiliary packets are associated;

control apparatus arranged to generate a Z-bit pointer which is concatenated with said W-bit code and said scramble key CS;

accumulating circuitry for incrementing an L-bit value by one unit for each memory address cycle; and means for appending the L-bit value to the concatenated Z-bit pointer, W-bit code, and said scramble key CS to form an N+M bit auxiliary packet memory address.

14. Apparatus in an audio/video signal transport processor for processing signal including time division multiplexed packets of program components, wherein respective packets include a payload of program component data and a header including a program component identifier, SCID, and wherein respective payloads are stored in buffer memory, circuitry for addressing said buffer memory comprising;

a source of time division multiplexed packets;

a detector, responsive to respective headers for detecting packets having predetermined identifiers;

a control apparatus programmed to generate a plurality of N-bit start and end pointers to allocate a plurality of blocks of said buffer memory for storage of packet payloads of a plurality of program components (N an integer);

first and second like pluralities of registers for storing said plurality of N-bit start pointers and N-bit end pointers respectively;

a third plurality of registers for storing N-bit head (write) pointers, wherein a set of registers, one from each of said first, second and third pluralities are assigned to each respective program component;

wherein for respective sets of registers:

circuitry for concatenating M bits of said start pointer with said N-bit head pointer to form an N+M-bit write address (M an integer less than N); and means for applying respective said write addresses to an address input port of said buffer memory.

15. The apparatus set fourth in claim 14 further including:

a comparator for detecting when a respective head pointer equals a corresponding end pointer; and means responsive to the detection of the head and end pointer being equal, for generating the next write address with said N-bit start pointer in the most significant bit positions of said M+N-bit write address and zeroes in the M least significant bit positions.

16. The apparatus set forth in claim 14 further including an adder for incrementing by one unit, respective head pointers each time such head pointer is used to form a write address.

17. The apparatus set forth in claim 14 wherein said packets are of two types, basic and auxiliary, and circuitry for generating buffer memory addresses for auxiliary packet payloads comprises:

a fourth plurality of registers, two for each respective program component, for storing N+M bit (read/write) auxiliary address pointers for auxiliary payloads;

means for determining the occurrence of auxiliary payloads; and means for multiplexing memory addresses generated from said auxiliary address pointers to an address port of said buffer memory.

18. The apparatus set forth in claim 17 wherein respective auxiliary packet headers include a scramble key CS, and circuitry for generating buffer memory addresses for auxiliary packet payloads comprises:

a detector for detecting said scramble key CS in respective auxiliary packets;

a translator for generating W-bit codes related to the type of program component with which respective auxiliary packets are associated;

control apparatus arranged to generate a Z-bit pointer which is concatenated with said W-bit code and said scramble key CS;

accumulating circuitry for incrementing an L-bit value by one unit for each memory address cycle; and means for appending the L-bit value to the concatenated Z-bit pointer, W-bit code, and said scramble key CS to form an N+M bit auxiliary packet memory address and loading respective N+M addresses in said fourth plurality of registers.

19. The apparatus set forth in claim 18 further including means for resetting said L-bit value for a component, to a predetermined value, at the beginning of respective packets containing an auxiliary payload of said component.

20. In a packet signal transport processor for processing signal packets of first and second types, basic and auxiliary, and respective packets having identifiers for denoting a program component contained in the corresponding packet payload, apparatus comprising:

a memory for storing packet payloads;

first direct memory access means for generating memory addresses for storing payloads of basic packets in said memory;

second direct memory access means for generating addresses for storing payloads of auxiliary packets in said memory, wherein said second direct memory access means generates addresses at least in part, as a function of an identifier associated with the current auxiliary packet.

* * * * *